July 12, 1966   L. E. LEAVITT ETAL   3,260,979
THROUGH-WALL ELECTROMAGNETIC COUPLING
Filed Dec. 11, 1963   2 Sheets-Sheet 1

INVENTORS
LIONEL E. LEAVITT
BY   DONALD GERTZ

July 12, 1966   L. E. LEAVITT ETAL   3,260,979
THROUGH-WALL ELECTROMAGNETIC COUPLING
Filed Dec. 11, 1963   2 Sheets-Sheet 2

INVENTORS
LIONEL E. LEAVITT
BY   DONALD GERTZ

United States Patent Office 3,260,979
Patented July 12, 1966

3,260,979
THROUGH-WALL ELECTROMAGNETIC COUPLING
Lionel E. Leavitt, Flushing, and Donald Gertz, Carle Place, N.Y., assignors, by mesne assignments, to the United States of America as represented by the United States Atomic Energy Commission
Filed Dec. 11, 1963, Ser. No. 329,933
5 Claims. (Cl. 336—212)

The present invention relates to apparatus for transferring electromagnetic information through a wall and more particularly to apparatus for transferring electromagnetic information through a steel vessel wall without penetrating the wall.

In a nuclear reactor such as that described in U.S. Patent No. 2,982,713, header arrangements are utilized for signal and power transmission wires passing through penetrations in the containment vessel wall. For example, in one arrangement, a penetration cover plate is welded in place having twenty independent holes of various sizes with tubes in each hole containing a minimum of two wires per tube. The tubes are filled with a sealing material to prevent leakage. This construction is considered adequate for maintaining the leak tightness of the vessel, however, it is quite apparent that over a period of years, especially in a shipboard environment the header arrangement could develop small leaks. This possibility allows for something less than maximum safety in the event of a nuclear incident, and maintenance problems as well are presented. Thus, quite obviously it would be very desirable to eliminate the containment vessel penetrations completely.

It has been proposed that electrical power or information could be transferred through the walls of a vessel without making penetrations by using electromagnetic energy. However, if the walls of the vessel are made of non-magnetic material such as non-magnetic steel which is typically used in the construction of nuclear vessels, severe limitations are imposed on any power or information transferring system involving the use of electromagnetic energy. For example, the transfer is limited to vessel wall thicknesses which are unduly small and even where the thickness can be reduced substantially there is a high degree of attenuation involved and hence a great loss in efficiency. In the event the wall material is magnetic in nature it is difficult if not impossible to pass a magnetic field through the wall due to the field being shunted away.

In accordance with this invention the electromagnetic approach for the transfer of power and information through a wall is adopted to accomplish this transfer efficiently. For information which is analog in nature, magnetic coupling through the wall is accomplished in accordance with this invention by utilizing low frequency alternating voltage in the range of 60–400 c.p.s., which, as is understood in the art, is a typical range of frequency for transmitting power and analog information. The non-magnetic steel wall material of the pressure vessel is modified to establish discrete magnetic paths by which coils on opposite sides of the wall are coupled. For the situation where the containment or pressure vessel wall is made up of a magnetic material the section of the wall through which the information is transferred is removed and a wall section welded in its place made up of material which is non-magnetic and the coupling is accomplished as above. For the transfer of digital information in accordance with this invention, coupling across the non-magnetic wall is accomplished by induction which is made to operate effectively by providing a coil configuration which induces highly penetrating magnetic fields.

It is thus a first object of this invention to transfer electrical energy through a wall without penetrating the wall.

Another object of this invention is to establish magnetic coupling through a wall of non-magnetic material.

Still another object is to couple inductively a pair of coils across a wall of non-magnetic material.

A further object of the invention is to transfer power and information through a wall without penetrating same with leads.

Other objects and advantages of this invention will become obvious from the following description of preferred embodiments of the invention taken with reference to the accompanying drawings in which.

Figure 1:
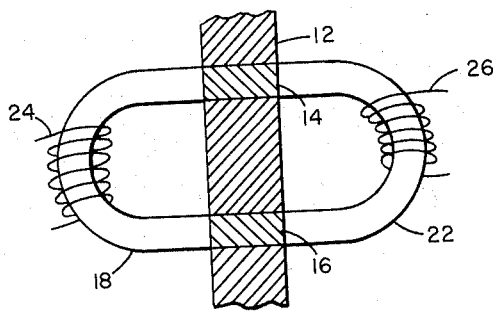
FIG. 1 shows a schematic illustration of an arrangement for transmitting analog sinusoidal signals in the 60–400 c.p.s. range through a non-magnetic steel plate.

Referring to FIG. 1 there is shown a portion of a non-magnetic metal wall 12 through which a pair of rods 14 and 16 made from magnetic material extend. Wall 12 would be made from an ordinary type of stainless steel which is generally non-magnetic in nature. Rods 14 and 16 would be welded permanently into place. A pair of U-shaped cores 18 and 22 made of magnetic material are mounted as shown to complete a magnetic path through wall 12. A primary coil 24 is wound on element 18 and a secondary coil 26 on element 22 so that coils 24 are magnetically coupled through wall 12 as is understood in the art.

An example of the arrangement shown in FIG. 1 which was tested and operated successfully at 60 c.p.s. is as follows: U cores 18 and 22 were manufactured from fifty (50) standard silicon steel laminations .016" thick. The core mean length excluding the rods was approximately 14" with a cross-sectional area of .225 in.$^2$. The primary and secondary windings had 2000 turns of #32 Formvar wire. With the use of rods of .844" diameter it was found that under open circuit conditions for a ½" wall thickness and the input voltage at 50 volts, the output was 45 volts, and for a 1" wall thickness the output voltage was 42.0 volts.

Figure 2:
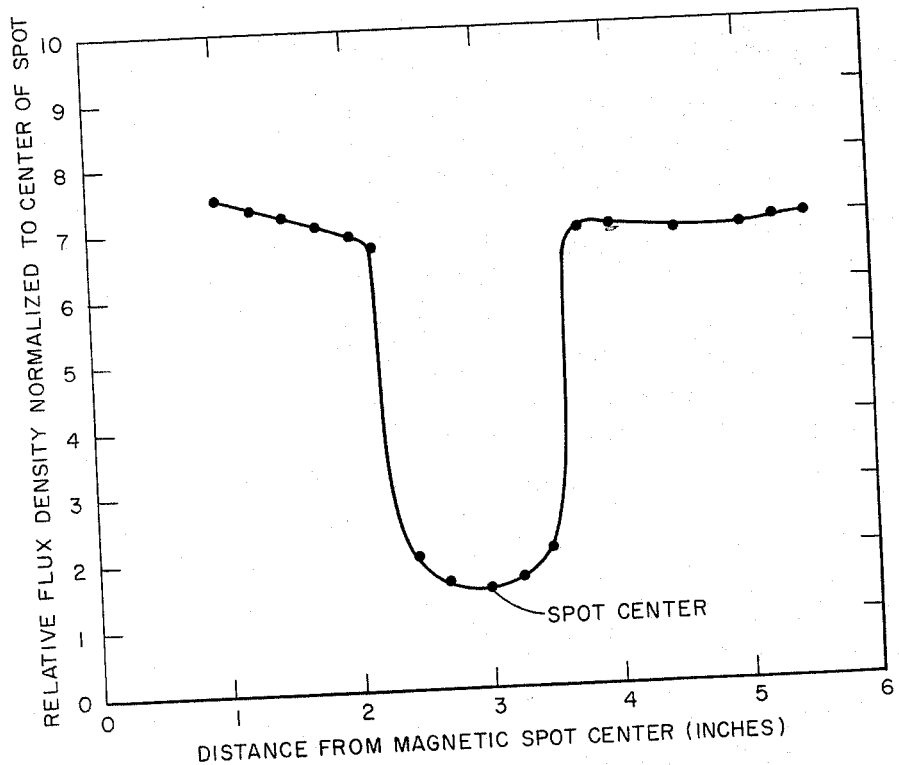
FIG. 2 is a graph showing the distribution of magnetic flux around a magnetic spot in a steel plate in accordance with this invention.

In an alternative to the above arrangement for establishing magnetic paths through a plate of non-magnetic material, electromagnetic coupling can be established in accordance with this invention by heat treating special types of stainless steels. Ordinary types of chromium-nickel stainless steels e.g. the 300 series, are austenitic (non-magnetic) at room temperature and cannot be made martensitic (magnetic) by heat treatment. However, certain types of chromium-nickel steels exist with specially proportioned compositions and unique heat treating capabilities. They are called precipitation hardened stainless steels. When fully annealed these steels are austenitic and non-magnetic or only slightly magnetic. They are, however, in a supersaturated solid solution state. By reheating these steels a transformation occurs with precipitation of the magnetic martensitic form and by localizing the reheating in accordance with this invention it is possible to establish discrete magnetic paths through the wall. This heat treating process is exemplified by the following example:

A $\frac{1}{16}$" thick section of 17–7 precipitation hardened steel was utilized, which, prior to heat treating was in a semi-austenitic state, with a permeability slightly greater than that of air. A magnetic path was established through the plate by flame heating a discrete section to 1300° F. and maintaining this temperature for one hour to achieve a localized martensitic state while cooling the remainder of the plate. The localized heating was obtained with aluminum heat sinks and circulating water as is understood in the art. The relative effectiveness of the described heat treating process was determined by utilizing a constant flux source, a magnet, and a Hall effect sensor. The Hall effect sensor, which is well known in the art and does not form a part of this invention consists of a semi-conductor material carrying current when the sensor is placed in a transverse magnetic field, so that an electric field is induced in the direction perpendicular to both current flow and the magnetic field. The flux source is placed on the side of the plate opposite from that of the Hall effect sensor, and the flux penetrating through the plate is measured by the Hall effect sensor on the opposite side. This permits a relative indication of the penetrability of flux into the plate at the heat treated spot and away from the spot. A plot of normalized flux density vs. distance along the plate for the magnetized spot is shown in FIG. 2 for a $1/16''$ thick plate. The same process can be applied to thicker plates with the use of special fixtures to supply sufficient heat to the isolated path while at the same time cooling the remainder of the plate.

The arrangement described above is suitable for transferring power and low level analog signals consisting of alternating current in the frequency range of 60 to 400 c.p.s. through steel containments. However, with proper modification in accordance with another preferred embodiment of this invention, magnetic through-wall coupling is suitable for digital signals. The on-off nature of pulses simplifies problems of signal detection and degradation of waveform due to the wall. Also, the low power levels necessary for digital circuitry makes losses in the wall relatively unimportant. In a typical sensing application the input to the through-wall couplers is a train of amplified pulses related in number to the parameter being measured. The frequency of these pulses may vary from a discrete non-repetitive single pulse to a continuous train of pulses at some higher repetition frequency. The limiting factor is the repetition rate of the pulse train. Experimental data shows this upper limit to be approximately 200 kcs. for a $1/8''$ thick nonmagnetic stainless steel wall. Below this upper frequency limit the through-wall coupler may be used in any digital system where it is desired to pass pulse type information through steel walls. This information may be a direct quantized parameter as in an acoustical type sensing system or a direct transmission of binary coded, straight binary or any other form of digital coded signals for a multitude of plant control functions.

Sharp pulses of current are easily generated in digital systems to create the necessary time varying magnetic field. The major problem which is solved by this invention with respect to the passing of digital information is the sufficient penetration of the non-magnetic steel wall by the magnetic field to obtain a signal on the other side of the wall to complete the through-wall coupling.

In a long solenoidal coil, the magnetic field is confined largely to the area inside, and as the solenoid is made shorter, the magnetic field projects further away from the coil, but the field strength is reduced. Solenoidal coils are useful for generating and receiving magnetic energy if the generator can be directly coupled to the high field region of the receiver as in a bifilar winding, or if the coils can be coupled with a high permeability closed magnetic path. Since neither of these alternatives is possible for a through-wall coupling device, another arrangement, in accordance with this invention is utilized. It has been found that a driver coil consisting of flat spiral coils placed directly against the wall backed by a slug of ferrite of the same diameter as the coils will cause the magnetic field lines to travel along the length of the slug. This forces the field lines to leave the coil more nearly parallel to the axis producing greater penetration into the wall. The field of the flat coil does not drop off as sharply as that of the solenoid coil. Since the high field region of the flat coil is not inaccessible as is the inside of the solenoidal coil, the point of greatest field strength of the flat coil can be placed directly against the wall. The use of the slug ferrite as a backing provides greater focusing.

To couple the flux from the spiral sending coil on the other side of the wall, a flat solenoidal receiving coil wound on a ferrite rod was found to result in linking the maximum amount of flux from the sending coil.

Figure 3:
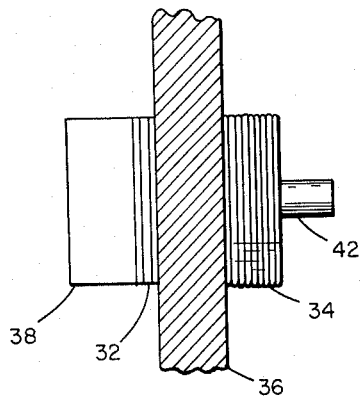
FIG. 3 is an alternative embodiment of this invention.
Figure 4:
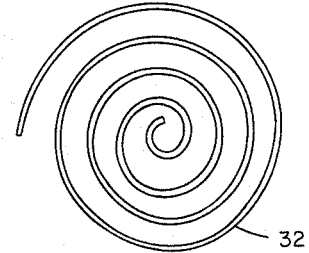
FIG. 4 is an elevation view of the helical coil used in FIG. 3.

Reference is made to FIGS. 3 and 4 showing details of the sending and receiving coils 32 and 34, respectively, mounted on opposite sides of a non magnetic steel wall 36. Sending coil 32 consists of several flat spiral coils with a cylindrical ferrite backing slug 38 while coil 34 is solenoidal in shape wound on a ferrite core 42.

Figure 5:
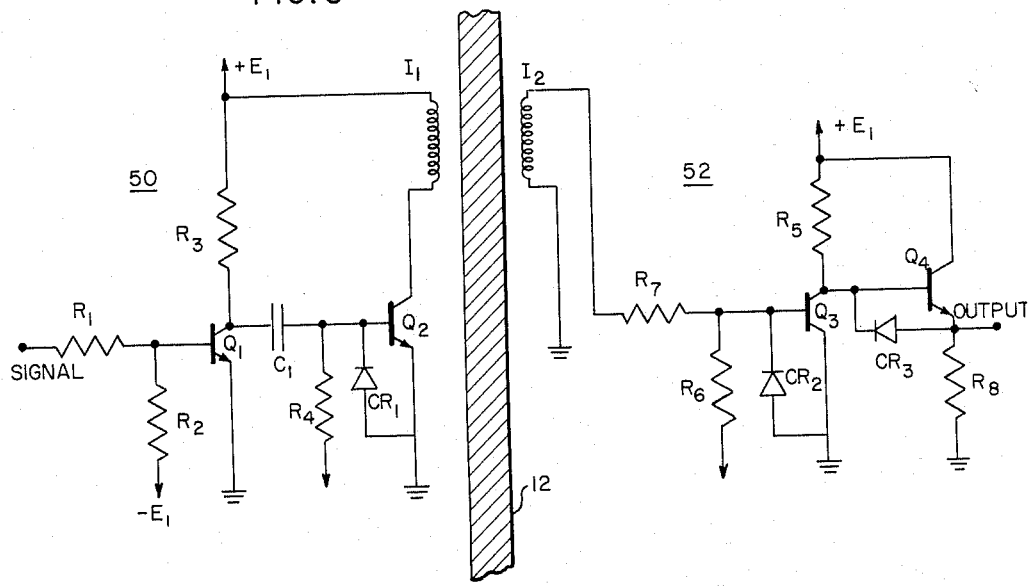
FIG. 5 shows the circuitry used with the arrangement of FIG. 3.

For the sending and receiving circuits utilized with the coil arrangement just described, reference is made to FIG. 5. There is shown a driver circuit 50 having a driver coil $I_1$ on one side of wall 12 and a buffer circuit 52 with the buffer or receiving coil $I_2$ on the opposite side of wall 12. Since relatively high peak currents are necessary in driver coil $I_1$ to provide sufficient output voltage, driver coil $I_1$ is placed in the collector circuit of a common emitter transistor switching stage utilizing transistor $Q_2$. The latter may be a 2N1049 which has a high current gain ($h_{FE}=30$ min. at $I_c=500$ ma. at 25° C.) and power dissipation capabilities ( 1.0 watt without heat sink at 25° C.). The high breakdown voltage of the 2N1049 ($V_{CEO}=80$ v.) is necessary because of voltage transients involved in this type switching circuit. Voltage spikes are also suppressed because of the reflected resistance of wall 12 which shunts driver coil $I_1$ and tends to protect the circuits. However, the design includes the high breakdown voltage transistor in case the unit is energized without the wall. The received signals are shaped and restored to 12 volt unloaded amplitude by the buffer circuit.

Driver circuit 50 consists of a switching transistor $Q_1$ and the previously described transistor $Q_2$. The input signal to transistor $Q_1$ is by way of a resistor $R_1$. Transistor $Q_1$ is normally biased into saturation by a sufficient positive signal at $R_1$. The base is connected to a negative voltage source $-E_1$ by way of a resistor $R_2$, the collector is connected through a resistor $R_3$ to the positive voltage source $+E_1$ and the emitter is connected to ground. The output of transistor $Q_1$ is taken from the collector through a capacitor $C_1$ to the base of transistor $Q_2$ which is normally biased into a cut-off state. The collector is connected through driver coil $I_1$ to the positive voltage source $+E_1$, and the base is connected to the negative voltage source $-E_1$ through a resistor $R_4$. A diode $CR_1$ is connected from emitter to base with the emitter being grounded as shown.

In the operation of driver circuit 50, transistor $Q_1$ is normally saturated as previously mentioned. When a pulse is present the input drops to zero, cutting off $Q_1$ and sending a current pulse into the base of $Q_2$. Capacitor coupling allows high base drive current into $Q_2$ for short pulses while blocking the D.C. which might be applied to the base of $Q_2$ due to a possible failure of either the signal or $Q_1$.

Buffer circuit 52 consists of a pair of transistors $Q_3$ and $Q_4$. The former is normally biased into cut-off, the emitter being grounded. The collector is connected to the positive voltage source $+E_1$ through a resistor $R_5$, and the base is connected into the circuit consisting of resistors $R_6$, $R_7$ and buffer coil $I_2$ between the negative voltage source $-E_1$ and ground at the common point of resistors $R_6$ and $R_7$. A diode $CR_2$ is placed across the emitter and base as shown. The output of transistor $Q_3$ is taken from the collector to the base of transistor $Q_4$ whose emitter delivers the output of the circuit. Biasing of transistor $Q_4$ into cut-off condition is accomplished by connecting the collector to the positive voltage source $+E_1$ and the emitter to ground through a resistor $R_8$. A diode CR3 is placed across the emitter and base.

The operation of buffer circuit 52 is as follows: The output of receiver coil $I_2$ switches transistor $Q_3$ from a normally cut-off state into saturation. The signal from $Q_3$ is direct coupled into the emitter follower output state $Q_4$. Diode CR3 speeds up the fall time of the output of $Q_4$ by providing a discharge path, for a possible capacitive load (such as cable) through the saturated preceding state $Q_3$.

The transistors described all have a fast switching speed. Since small amounts of power are necessary to trigger the digital circuits driven by the thru-wall coupler, buffer power dissipation is not a factor in their selection. The circuitry is designed to operate under worst-case conditions specified by temperature limits of $-30°$ C. to $+100°$ C. The most important parameters taken into consideration are the decrease in $h_{FE}$ of the transistors at low temperatures and increased leakage current $I_{co}$ at elevated temperatures. Other parameters considered are degradation of power capability of resistors and voltage rating of capacitors at higher temperatures.

An example of the driver and buffer circuits is given in the following table:

Table

| | |
|---|---|
| $R_1$ | 2.2K |
| $R_2$, $R_4$ | 51K |
| $R_3$ | 330 |
| $R_5$, $R_8$ | 1K |
| $R_6$ | 620K |
| $R_7$ | 3.0K |
| $C_1$ | 1.0µf. |
| $Q_1$ | 2N697 |
| $Q_2$ | 2N1049 |
| $Q_3$, $Q_4$ | 2N708 |
| $CR_1$, $CR_2$, $CR_3$ | 1N906 |

Driver coil $I_1$ consists of three layers of flat spiral coils at fifty turns each for a total of 150 turns using #35 wire, the spiral having an O.D. of .79", a height of 1/16" and a ferrite slug backing of 1/4" thickness. Buffer coil $I_2$ consists of a 500T solenoidal coil made of #34 wire and an O.D. of .79" using a 1/4" ferrite rod.

While several modifications of this invention have been described it is to be understood that the scope of this invention is to be defined only by the appended claims.

We claim:

1. Apparatus for transferring electrical information through a sealed wall of non-magnetic material comprising means establishing a pair of spaced paths of magnetic material integral with and through said wall, a first core of magnetic material connecting said paths on one side of said wall and a second core of magnetic material connecting said paths on the other side of said wall, thereby forming a closed magnetic circuit, and means for coupling said magnetic circuit into sending and receiving circuits on opposite sides of said wall.

2. Apparatus for coupling a primary coil to a secondary coil located on opposite sides of a sealed wall made from non-magnetic material comprising a pair of separated paths of magnetic material integral with and through said wall, a first core of magnetic material coupled to said primary coil connected across said magnetic paths on one side of said wall, and a second core of magnetic material coupled to said secondary coil connected across said magnetic paths on the other side of said wall, a closed magnetic circuit being formed by said cores and paths coupling said coils magnetically with each other.

3. The apparatus of claim 2 in which said wall is made of non-magnetic austenitic stainless steel and said magnetic paths are of magnetic martensitic steel formed by localized heat treatment of said wall.

4. Apparatus for transferring electrical energy through a solid wall made from non-magnetic material comprising at least one flat spirally wound sending coil placed against one side of said wall, a core of magnetic material backing up said coil against said wall, a helical receiving coil on the other side of said wall directly opposite said sending coil, and a solenoidal core of magnetic material within and extending back from said receiving coil, said sending coil thereby directing a magnetic field to penetrate said wall to be detected by said receiving coil.

5. The apparatus of claim 4 in which said cores are made from ferrite material.

References Cited by the Examiner

UNITED STATES PATENTS

| 2,044,743 | 6/1936 | Bain et al. | 148—136 |
| 2,141,573 | 12/1938 | Vogt | 336—212 X |
| 2,387,943 | 10/1945 | Putman | 336—212 |
| 2,395,608 | 2/1946 | Aborn | 148—136 |
| 2,412,914 | 12/1946 | Seastone et al. | 336—212 |
| 3,092,763 | 6/1963 | Cherel | 317—201 |
| 3,191,136 | 6/1965 | Connell et al. | 336—84 |

LARAMIE E. ASKIN, *Primary Examiner.*

ROBERT K. SCHAEFER, *Examiner.*

W. M. ASBURY, *Assistant Examiner.*